United States Patent [19]

Langley et al.

[11] Patent Number: 5,214,096

[45] Date of Patent: May 25, 1993

[54] WATER SOLUBLE ACRYLIC POLYMERIZABLE MATERIALS, POLYMERS MADE FROM THEM, AND PROCESSES OF MAKING THEM

[75] Inventors: John G. Langley; Kishor K. Mistry; Kenneth C. Symes, all of West Yorkshire, England

[73] Assignee: Allied Colloids Limited, England

[21] Appl. No.: 801,586

[22] Filed: Dec. 2, 1991

Related U.S. Application Data

[63] Continuation of Ser. No. 656,019, Feb. 15, 1991, abandoned, which is a continuation of Ser. No. 307,428, Feb. 7, 1989, abandoned.

[30] Foreign Application Priority Data

Feb. 8, 1988 [GB] United Kingdom ................. 8802789
Feb. 8, 1988 [GB] United Kingdom ................. 8802790

[51] Int. Cl.$^5$ ............................................... C08J 3/32
[52] U.S. Cl. .................................... 524/812; 524/814; 524/819; 524/820; 524/823; 526/306; 526/316
[58] Field of Search ............ 526/306, 316; 524/812, 524/814, 819, 823, 820

[56] References Cited

U.S. PATENT DOCUMENTS

| | | | |
|---|---|---|---|
| 2,576,502 | 11/1951 | Dalton et al. | 526/306 |
| 2,627,512 | 2/1953 | Zerner et al. | 526/306 |
| 4,330,640 | 5/1982 | Buchwalter | 526/306 |
| 5,037,881 | 8/1991 | Kozakiewicz | 524/812 |

Primary Examiner—Joseph L. Schofer
Assistant Examiner—Alex H. Walker
Attorney, Agent, or Firm—Ostrolenk, Faber, Gerb & Soffen

[57] ABSTRACT

Water soluble polymerizable acrylic prepolymers can be formed from ethylenically unsaturated monomers that include monomers that provide a pendant group that is a blocked, saturated, ethylenic group, followed by unblocking the pendant saturated ethylenic group to leave a pendant ethylenically unsaturated group. These prepolymers can be copolymerized through these unsaturated groups, for instance after impregnation into a permeable substrate as in chemical grouting or shut off processes, to form cross linked solid polymers. The polymerizable monomers that are ethylenically unsaturated but which also include the blocked ethylenic group are also novel.

11 Claims, No Drawings

WATER SOLUBLE ACRYLIC POLYMERIZABLE MATERIALS, POLYMERS MADE FROM THEM, AND PROCESSES OF MAKING THEM

This is a continuation of application Ser. No. 07/656,019 filed on Feb. 15, 1991, now abandoned, which was a continuation of application Ser. No. 07/307,428 filed Feb. 7, 1989, now abandoned.

This invention relates primarily to acrylic polymers that can be made by polymerisation in aqueous solution of a water soluble, ethylenically unsaturated, polymerisable material or blend of such materials. The recurring units in an acrylic polymer often consist solely of acrylic units but a minor amount, up to 50 mole %, of the units may be derived from other ethylenically unsaturated materials, such as other vinyl units or from allyl units.

It is well recognised that cross linked polymers of this general type have wide utility in industry. One reason for their value originates from the physical properties that are associated from the acrylic backbone of such polymers, in contrast to the physical properties associated with polymers having backbones formed mainly of other ethylenically unsaturated monomers. Another reason for their success arises from the controllability of the polymerisation, as a result of which it is possible to perform the polymerisation and cross linking reactions to carefully predetermined criteria, so as to obtain reproducible properties.

Despite these benefits, they do suffer from some disadvantages. When handling acrylic monomers it is necessary to avoid problems arising from possible toxicity, flammability or corrosiveness. The polymerisation reaction is generally exothermic and this can also cause difficulties. For instance it can adversely affect any heat sensitive material present in the mixtures, e.g., fragrances or biological materials to be encapsulated in the acrylic gel matrix. The handling and polymerisation of these products is therefore best carried out by those skilled in the art and on premises designed for the purpose.

There is a requirement for the production of cross-linked poly(acrylate) or poly(acrylamide) type gels on site, that is to say at their intended place of use, or in some intermediate manufacturing facility away from the specialised resources described above. In particular there is a need for new materials which can be used for stopping or reducing the flow of water through a permeable substrate, for instance as chemical grouts in civil engineering operations, as sewer sealants, and for water shut-off applications in the oil industry.

It has become accepted practice to use acrylic monomers, especially salts of acrylic acid and/or acrylamide combined with cross-linking monomers, for these applications. The monomers are injected into the soil, gravel or underground formation and polymerised in situ. The gel thus formed has many desirable features and has proved in practice to be one of the best ways of achieving the reduction in permeability. However if variation in the ambient conditions causes the polymerisation to fail or to be incomplete, monomer is left in the environment and this is undesirable.

Another area where the advantages of the poly(acrylic) gel are wanted but the disadvantages associated with handling monomers (particularly the heat generated during their polymerisation and possible interaction between the active ingredient and the initiator) can be decisive is in the entrapment or encapsulation of various active products. These are often for use in agriculture, such as pheromones and insecticides. They may be biological materials such as cells, enzymes, spores or toxins. They may be volatile, such as fragrances.

One way of overcoming some of the problems described above is to start with a relatively low molecular weight polymer and cause it to become cross-linked, for instance poly(acrylamide) can react with a dialdehyde to give a cross-linked gel. In some applications this method may be adequate; in others it would be quite inappropriate. For example, chemical grouts must be of very low viscosity for injection into tight pores and be capable of undergoing controlled gelation, both of which are difficult to achieve with the cross-linking mechanism. For entrapment of biologically active materials, the cross-linking agent can be unacceptable by virtue of its biocidal side-effects for instance.

Another method involves the application of acrylic polymer and its cross linking in its final location with trivalent chromium, or other polyvalent metal ions, often generated in-situ by reduction of, for instance, hexavalent chromium or as a chelated species, for example, aluminium citrate. The provision of metal ions is generally inconvenient and can involve toxicity problems, and controlling the polymerisation by metal or aldehyde cross linking is difficult.

Another process involves applying acrylamide monomer and polymerising it in its desired location, but this involves exposing the environment to free monomer.

There have been numerous proposals in the literature to make polymerisable prepolymers, that is to say polymers that contain ethylenic unsaturation such that they can be further polymerised. Some of these polymers are acrylic polymers but they have not met the requirements of water solubility and the ability to satisfactorily polymerise to form solid polymers. For instance in GB1490308 and U.S. Pat. No. 3,996,237, certain acrylic prepolymers are described but their side chains are relatively hydrophobic and so they are not suitable for use as water soluble polymerisable acrylic prepolymers.

In EP96459 acrylic polymers are formed which initially are always insoluble but it is stated that a vinyl ended polymethyl acrylate can be hydrolysed to form a vinyl ended polyacrylic acid. Although there is one statement in EP96459 to the effect that the polymers contain at least one terminal olefinic group, the entire description makes clear that there is only a single terminal ethylenically unsaturated group, with the result that this prepolymer only has the capacity for chain extension or for graft copolymerisation with other monomers. This, combined with the insolubility in water of most of the polymers described therein, renders this disclosure of no value to the problem of producing water soluble polymerisable acrylic prepolymers.

There are numerous disclosures in the literature of the formation of low molecular weight polymers that are free of acrylic groups and then putting terminal acrylic groups on to these. The properties of these prepolymers are dictated largely by the nature of the initial polymeric chain, which is not acrylic. Accordingly these polymers are also not relevant to the problem of improving water soluble polymerisable acrylic prepolymers.

There have also been proposals to react a hydroxyl-bearing substrate with N-methylolacrylamide, for instance in EP0177296 and 0249306 and in U.S. Pat. Nos. 4,079,025 and 4,511,646. The hydroxyl-bearing substrate is usually a material such as starch or dextrin but in EP1077296 and 0249306 it is proposed to use polyvinyl alcohol as the substrate. Again therefore the product is not an acrylic prepolymer but is instead a modified polyvinyl alcohol.

In U.S. Pat. No. 3,766,144 a water soluble polyacrylamide is reacted with formaldehyde to form methylolacrylamide groups and these are then reacted with an ethylenically unsaturated monocarboxylic acid or a hydroxyalkyl ester thereof to form a pendant group having, for instance, the structure —CONHCH$_2$OCOCH=CH$_2$. In theory this product could be polymerised through the pendant groups. In practice however it is unsatisfactory for a number of reasons. The reaction with formaldehyde is complicated by the possibility of cross-linking. The final product is likely to be contaminated with formaldehyde, and this can make it difficult to comply with some safety standards. It would be expected to be desirable to use relatively high concentrations of relatively high molecular weight polymer. However the tendency to cross-linking increases with increasing molecular weight, and increasing the concentration and/or molecular weight increases the viscosity of the polyacrylamide solution and it becomes very difficult to introduce sufficient formaldehyde and acrylic acid or hydroxyalkyl ester of acrylic acid into the reaction to achieve a useful degree of functionality. Accordingly the degree of substitution will inevitably be very low unless the polymer is itself of very low molecular weight. Additionally it will be extremely difficult to regulate the extent of reaction between the formaldehyde and acrylamide groups and then between the acrylic acid or hydroxyalkyl ester and methylolacrylamide groups and indeed very forcing conditions would be needed to achieve any useful reaction between the acrylic acid and the methylolacrylamide groups. In practice therefore the degree of substitution of unsaturated groups on to these polymers will always be very uncertain and generally very low and the molecular weight of the prepolymers will also generally be very low. Accordingly these have not proved useful water soluble polymerisable acrylic prepolymers for general usage.

Although the pendant groups on most acrylic polymers are of conventional types such as amide, acid, alkyl ester or dialkylaminoalkyl ester, other types of pendant groups are known for the purpose of imparting particular types of activity to the polymers. Examples are given in EP0177296 (where a quaternary amino group is added across the double bond of a methylolacrylamide group), GB2051791 and U.S. Pat. No. 4,584,402. Although these pendant groups impart particular activity to the products, they are not relevant to the problem of providing a water soluble polymerisable acrylic prepolymer.

Accordingly there remains a need for water soluble polymerisable acrylic materials that can have a chosen, high, functionality and that can be of relatively high molecular weight and that can be made easily.

A water soluble polymerisable acrylic prepolymer according to the invention has 50 to 100 mole % recurring units derived from acrylic monomers (a) and 0 to 50 mole % recurring units derived from other ethylenically unsaturated monomers (b), and in this prepolymer there are units of formula (c)

in an amount that is at least 3 units per prepolymer molecule and that is from 0.001 to 100 mole % of the prepolymer and in which B is H, CH$_3$ or COOH, D is H or COOH, Z is a linking group having 1 to 6 functionalities, n is an integer from 1 to 6 and R$^1$ is the group —CB=CHD, and the prepolymer has been made by (i) polymerising polymers (a) and (b) wherein 0.001 to 100% of the said monomers have the formula (d)

where D, B and n are as described above and R$^2$ is a saturated ethylenic group that can be unblocked to form a group R$^1$ and (ii) unblocking the groups R$^2$ to form units of formula (c).

A process for making the prepolymer thus comprises polymerising ethylenically unsaturated monomers of which at least 50 mole % are acrylic monomers and of which 0.001 to 100 mole % are monomers of formula (d) to form a water soluble blocked polymer having blocked pendant groups of formula (e)

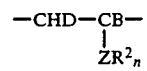

and then unblocking the groups R$^2$ to form the polymer having units of formula (c).

The resultant prepolymer can have the physical properties associated with acrylic prepolymers because the polymer does not include large amounts of non-acrylic material, such as polyvinyl alcohol or starch, in its backbone. The prepolymer can have a carefully preselected composition as a result of selection of the appropriate monomers from which it is made. The prepolymer can have either high or low molecular weight, and the proportion of units of formula (c) can be selected independent of the molecular weight. In particular the molar proportion of unsaturated groups can be selected at will between the prepolymer being a homopolymer of these groups to the prepolymer containing a very low proportion, but in all instances the prepolymer will contain at least 3 of these unsaturated groups in each polymer chain and thus the polymerisation of the prepolymer will easily lead to a very satisfactory cross linked gel structure.

The subsequent polymerisation of the prepolymers can be homopolymerisation and the exotherm associated with the polymerisation of the prepolymers is always very much less than the exotherm that would have been associated with the polymerisation of the equivalent final polymer from the starting monomers.

Thus the prepolymers provide the advantages of known systems of providing cross linked acrylic polymers from aqueous solutions but are safe in the environment, for instance in the ground, and avoid the disadvantages due to the exotherm, the risk of contamination by free acrylamide or other undesirable monomer and the problems associated with cross linking preformed polymers using aldehydes or metal. The polymer of the invention is its own cross linking agent and by appropriate choice of the number of pendant groups and the molecular weight of the polymer, and the presence or absence of comonomer, it is possible easily to control and optimise the properties of the final gel or film.

Since monomer can be absent, or in low amounts only, the risk of residual monomer remaining in the gel is substantially eliminated. It is possible to control proportions so as easily to cure in situ to obtain flexible but firm gels that are not brittle, have good gel strength, good water impermeability, good dehydration/rehydration properties and so do not crack upon variations in the water content, and resistance to biodegradation. The system is therefore of particular value in processes such as chemical grouting. Because the acrylic backbone can be made by conventional polymerisation of monomers having conventional unsaturation, and which are thus readily and cheaply available, it is possible easily to obtain these properties at low cost.

The water soluble prepolymer of the invention must be water soluble in the sense that it is soluble at the concentration of polymerisable polymer that is to prevail in the aqueous solution that is put into the shape or location at which polymerisation is to occur. Generally this solution has a concentration of at least 1% and so the polymer should have such a solubility. When the polymer has relatively high molecular weight, it may be used at relatively low concentrations, e.g., 2 to 10%, in which event solubility at these levels is adequate. However when the polymer has lower molecular weight it may be used in much higher concentrations, e.g., 10 to 50%, in which event it must have solubility at these levels. Generally the polymer has a solubility of at least 10% (100 g per liter) in deionised water at 20° C.

At least 50 mole % of the monomers used for forming the prepolymer must be acrylic and usually at least 80 mole % are acrylic. The monomers may be anionic, non-ionic or cationic, or blends thereof.

Suitable anionic acrylic monomers that can be used include (meth) acrylic acid, acrylamido methyl propane sulphonic acid, maleic acid, itaconic acid, crotonic acid and other carboxylic and sulphonic ethylenically unsaturated acids. Suitable non-acrylic anionic monomers are vinyl sulphonate and, especially, allyl sulphonate. The acids may, as is conventional, be used in free acid or water soluble (generally sodium) salt form.

Suitable cationic acrylic monomers include dialkylaminoalkyl (meth) -acrylates and -acrylamides, as the free base, acid addition or quaternary salts. Suitable non-acrylic cationic monomers include diallyldimethylammonium chloride and N-vinyl pyridine.

Suitable non-ionic acrylic monomers include diacetone acrylamide and alkyl and hydroxyalkyl (meth) acrylates in which the alkyl group and the proportion is such that the overall blend of monomers is water soluble. The preferred non-ionic monomer is acrylamide. Suitable non-ionic non-acrylic monomers include vinyl-pyrrolidone.

Although the prepolymer can be a homopolymer of the units of formula (c) it is generally a copolymer with at least 5% and usually with at least 50% of other ethylenically unsaturated monomer.

Preferred polymers according to the invention are formed from 5 to 95%, generally 50 to 95% acrylamide units with the balance being acrylic or other units of formula (c).

The blocked monomer (d) that is used to introduce these units (c) may be a vinyl monomer, for instance where the vinyl group is linked to the blocked group through an ester, amide or keto group, for instance made by mono-blocking a difunctional monomer such as vinyl acrylate or divinyl ketone or 2-allyloxyethyl meth acrylate. In the blocked part $R^1$, B is usually H or $CH_3$ and D is usually H. The unsaturated part of the monomer may be derived from, for instance, crotonic, itaconic or maleic acid, but again preferably D is H and B is $CH_3$ or, usually H.

It is in practice rather unsatisfactory to try to provide monomers of formula (d) where the linkage Z includes both amide and ester linkages and preferably Z is —CO—(keto), —OCO—(carboxylic), —AOCO—, —COOAOCO— or —CONHANHCO— where A is alkylene that is optionally substituted and that is optionally interrupted by O or NH.

The polymers made from monomer (d) are, before deblocking, new materials and form a further part of the invention.

The polymers that include the preferred units of formula (c) are themselves new materials and could, less satisfactorily, be made by other techniques such as condensation of unsaturated groups $R^1$ on to a preformed polymer. Thus the invention includes also novel water soluble acrylic polymerisable prepolymers formed of 50 to 100 mole % recurring units of acrylic monomers (a) and 0 to 50 mole % recurring units of other ethylenically unsaturated monomers (b) in which units of formula (c) are present in an amount that is at least 3 in each polymer chain and that is from 0.001 to 100 mole % wherein D, B, $R^1$ and n are as defined above and Z is —CO—, —OCO—, —AOCO—, —COOAOCO— or —CONHANHCO— where A is alkylene which is optionally substituted and is optionally interrupted by O or NH.

The alkylene group A is generally an uninterrupted chain of carbon atoms and then usually contains 1 to 6 carbon atoms. The chain can be substituted by non-interfering groups such as hydroxylic and/or carboxylic groups. The chain can, however, be interrupted by ether or imino linkages. The chain can then be rather long since the ether or imino linkages will tend to promote water solubility despite the chain length. For instance A may be the residue of a polyethylene glycol or imine. Generally the chain contains not more than 3, and usually only 1 or 2, interruptions and then has 2 to 12, often 2-6, carbon atoms in the chain.

n is usually below 5, usually below 3 and generally is 2 or, most preferably, 1. For instance when Z is COOAOCO and n is 2, the monomer of formula (d) may be the triacrylic ester of trimethylolpropane.

It is particularly preferred that the linkage Z should be an amide linkage, partly because this promotes solubility and partly because it tends to provide good stability against the alkaline conditions that are normally present during the deblocking. A preferred linkage is of formula (f)

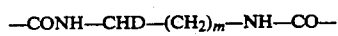

where D is hydrogen or carboxyl and m is zero or an integer of 1 to 5, usually 2 or, preferably, 1. Preferably D is hydrogen and m is zero.

The blocked groups $R^2$ must be capable of being unblocked to form the desired group $R^1$ under reaction conditions that will not damage the prepolymer.

The blocked monomer is preferably a monomer that provides a pendant group containing β-substituted ester acid, ketone, aldehyde or nitro functionality and that can undergo β-elimination, as the unblocking mechanism.

The unblocking is promoted if the β substituent is a good leaving group, and this in turn is promoted if the α carbon atom is activated in such a way as to promote the leaving of the β substituent. If the end group is an acrylic group, then the carbonyl that is adjacent to the α carbon atom will activate the proton attached to the α carbon atom and will thus make it more acidic and susceptible to react in the first step of the β elimination. If the end group is not acrylic, then the α carbon atom can be activated by other substituents, for instance cyano or nitro. Accordingly the preferred groups $R^2$ are those in which $R^2$ is bonded by its α carbon atom to a carbonyl group (that is in the linkage Z) and has the formula

—CHR.CH$_2$Y and Y is a leaving group in β-elimination reactions such as Cl, Br, I, $R^3SO_3$, $R^3CO_2$, $R_3{}^3N+$, $R_2{}^3P+$, $R_2{}^3S+$, $R_2{}^3N$, HO, $R^3O$. Instead of relying on a terminal carbonyl group in Z to activate the group $R^2$, it may have the formula

—CHX.CH$_2$Y where X is CN or NO$_2$ or other activating group and Y is as defined above. In all these, R is hydrogen or methyl and $R^3$ is any alkyl, aryl, alkaryl or aralkyl or cycloalkyl group that is suitable, usually $C_{1-8}$ alkyl especially $C_{1-2}$ alkyl.

Preferably the end group is itaconic, maleic or other acrylic group since the carbonyl then activates the leaving reaction, but other unsaturated N groups that can be groups include vinyl and allyl.

The unblocking or elimination reaction can be brought about simply by exposure of the relevant group to high temperature but will occur more simply and under milder conditions with a basic catalyst. Bases used in elimination reactions include $R_3{}^3N$, $CH_3CO_2^-$, $HO^-$, $R^3O^-$, $H_2N^-$, and $CO_3{}^=$, and $H^-$ donors. Generally the pH during the unblocking reaction is above 8, often above 10, for instance 11 or 12 to 13, and the linkage Z must be stable to the unblocking conditions. More forcing conditions will be required for amino, hydroxyl, alcoholate and enolate anions than for the other values of Y.

Particularly preferred blocking groups are quaternary ammonium groups, especially when the α carbon atom is bonded to carbonyl. Examples are quaternary derivatives of dimethyl- or diethyl-amino or morpholinium compounds.

The invention includes also the preferred blocked polymerisable monomers of formula (d) where $R^2$ has any of the values quoted above and Z is —CO—, —OCO—, —AOCO—, —COOAOCO— or —CONHANHCO— where A is as defined above, D is H and B is H or CH$_3$.

A preferred monomer is quaternised N-(β-dimethylaminopropionamidomethyl) acrylamide, the quaternisation being with methyl chloride or other suitable quaternising agent. This is the quaternised form of the mono-addition product of the reaction between dimethylamine and methylene bis-(acrylamide). This is a novel compound. It and homopolymers of it and copolymers of it with other ethylenically unsaturated monomers (i.e. blocked prepolymers) form a further part of the invention.

Thus typical blocked monomers would have these constituents:

| Disfunctional Monomer-Analogue | Y | R | ZR$^1$ |
|---|---|---|---|
| methylene bis-(acrylamide) | (CH$_3$)$_3$N+ | H | —CONHCH$_2$NHCOCH=CH$_2$ |
| vinyl acrylate | (CH$_3$)$_3$N+ | H | —OCO—CH=CH$_2$ |
| divinyl ketone | CH$_3$SO$_3$− | H | —COCH=CH$_2$ |
| 2-allyloxethyl methacrylate | Cl− | Me | —CH$_2$OCH$_2$CH$_2$OCOCH=CH$_2$ |

The blocked monomers can be readily prepared by a conjugate addition reaction. Carbon-carbon double bonds conjugated with electron sinks (see Organic Chemistry, D. J. Cram and G. S. Hammond 2nd Ed'n. McGraw-Hill New York, 1964 p.320) serve as good substrates in nucleophilic addition reactions. Thus hydrogen halides, thiols, amines and carboxylic acids add readily to highly polarised double bonds in conjugated systems.

In a preferred process a secondary amine is added across one of the carbon-carbon double bonds in a difunctional monomer to give a blocked monomer. The blocked monomer may then be subjected to a quaternization reaction with methyl chloride or dimethyl sulphate or other quaternising agent to convert the β-substituent to the quaternary nitrogen derivative. This substituent then becomes a very reactive leaving group, and the tri-alkyl amine generated by base-catalysed β-elimination can be readily removed from the blocked monomer as a gas by application of reduced pressure to the solution.

In some instances, formation of disubstituted monomer may occur, and this could lead to contamination of the polymerisable prepolymer with part of the original difunctional monomer, which may act as a cross linking agent during subsequent polymerisation. This may be acceptable. However, if it is required to have the final mixture free of this type of residue, the original difunctional substrate can be chosen so that it contains two ethylenically unsaturated groups capable of free-radical polymerisation, but only one of which is liable to react under conjugate addition reaction conditions. Thus vinyl and allyl groups normally would not be expected to react but acrylate, methacrylate, itaconate and maleate would.

Instead of forming the blocked monomer by partially blocking a di or polyfunctional ethylenically unsaturated monomer, it can be made by combining an ethylenically unsaturated monomer with a blocked ethylenically unsaturated monomer, for instance by blocking the unsaturation of hydroxy ethyl acrylate and then esterifying this with acryloyl chloride. This eliminates the risk of variable degrees of blocking of the unsaturated groups.

An alternative blocked monomer synthesis is the Mannich reaction of α,β-unsaturated ketones as described by Mironor et al. *J.Gen. Chem. USSR*, 33(5), 1476–1480 (1963) and in U.S. Pat. No. 4,672,136. However, in neither of these publications is it suggested that the blocked group should serve as a protecting device for introducing pendant ethylenically unsaturated groups into polymers, nor are unsaturated polymers made or their synthesis discussed.

It is generally preferred for the deblocking reaction to go to completion but in some instances incomplete deblocking is satisfactory since the residual blocked groups can impart desirable properties in some instances. For instance quaternary ammonium blocking groups will impart cationicity to the polymer.

Although we refer herein to the blocked and unblocked groups being pendant to the polymer, it will of course be appreciated that some will often be present as terminal or end groups.

The deblocking reaction may be conducted in one stage or in two stages. For instance a prepolymer may be formed from a monomer in which the blocking group is a quaternary amine group, and deblocking can then occur in one stage. Alternatively a prepolymer can be formed from the corresponding unquaternised tertiary amine, and deblocking then involves a first stage of quaternisation of the polymer, followed by elimination.

The molecular weight of the polymerisable prepolymer can be controlled in conventional manner to any desired value, for instance as low as 1000 to 2000 but is generally above 5000. It can be up to 100,000 or even 1 million or several million and will generally be chosen having regard to the desired end use and properties that are required. Higher molecular weights will require that the blocked monomer contains insignificant amounts of di- or poly-functional monomers or impurities because during polymerisation or copolymerisation the resulting blocked polymer will simply form a crosslinked gel. As the molecular weight decreases, so a certain amount of di- or poly-functionality, can be tolerated if a degree of branching in the final polymer is acceptable. Either situation can prevail by a suitable choice of Y, R, Z and $R^1$ and the synthetic method adopted.

The prepolymer, containing the pendant polymerisable groups, may be a homopolymer or may be a copolymer with other ethylenically unsaturated monomers. If it is a copolymer the optimum molar proportion of pendant ethylenically unsaturated groups generally decreases with increasing molecular weight. For instance, low molecular weight polymers (e.g., below 5,000) normally require at least 5 mole percent of the monomer that provides the pendant groups. For polymers of molecular weight 50,000 to 100,000 a suitable amount is 0.5 to 1.0 mole percent and for polymers of molecular weight 500,000 to 1 million a suitable amount is 0.05 to 0.001 mole percent.

In general, to ensure on average at least say four ethylenically unsaturated groups per macromolecule the molar proportion of blocked monomer in the copolymer needs to be higher than X mole percent where, $$X = \frac{2.5 \times 10^4}{Mn}$$

(Mn is the number average molecular weight of the pre-polymer to be synthesised as measured by Gel Permeation Chromatography).

The unsaturated groups in the polymer are assumed to be randomly distributed along and amongst the polymer chains. Thus smaller molecules in a polydisperse mixture will be on average less poly-functional than larger ones. For most purposes it is only necessary to ensure that the lowest MW fraction carries at least one polymerisable group per macromolecule and that an adequate proportion of the product is in the form of polymer chains each containing at least 3, and usually many more, of the groups.

The blocked prepolyer can be formed by polymerisation of the chosen blocked monomer or monomer blend by any of the polymerisation techniques which are well known and are suitable for the polymerisation of water soluble ethylenically unsaturated monomers, especially acrylic monomers. It could be done at relatively high concentrations (e.g., as a gel) generally followed by dilution for the unblocking reaction, but is generally performed as aqueous solution polymerisation. The polymerisation may be initiated by, for instance, redox, thermal or photoinitiation. Molecular weight may be controlled in conventional manner. The blocked groups may then be deblocked to provide the desired prepolymer.

The prepolymer is generally provided in the form of an aqueous solution having whatever concentration is convenient in view of the molecular weight of the prepolymer and the intended product that is to be formed.

This final polymeric product is obtained by polymerising the prepolymer. For many purposes, it is preferred that the polymerisation is by homopolymerisation but if desired the prepolymer can be copolymerised with one or more other ethylenically unsaturated monomers, generally acrylic monomers, for instance any of the anionic, cationic and non-ionic monomers described above. The polymerisation mixture is generally formed of 70 to 100%, most preferably 85 to 100% by weight of the prepolymer and 0 to 30%, preferably 0 to 15%, of the added monomer. If added monomer is present, its amount is usually at least 2%. The presence of small amounts of such monomers can be valuable to modify the polymerisation process or product, for instance the use of a low amount, e.g., 5 to 15%, sulphonic or carboxylic monomer, e.g., sodium acrylate, can increase the rate of gel formation at the start of the process.

Although the polymerisation can be conducted in bulk followed by drying and comminution, the preferred process of the invention comprises shaping an aqueous solution of ethylenically unsaturated material comprising the prepolymer, and optionally other monomer, and then polymerising it to form a shaped polymeric product. Often the prepolymer solution is polymerised as a coating on a substrate or as an impregnant through a porous structure. Alternatively it may be shaped, e.g., as fibres, sheets or strips and then polymerised.

Polymerisation can be initiated by any of the conventional techniques for ethylenically unsaturated materials, for instance by redox, thermal or photoinitiation. Conventional initiators can be used but, especially when the aqueous solution is being applied downhole where elevated temperatures apply, thermal initiation is often preferred, and so an appropriate thermal initiator may be included. By selecting an initiator which initiates polymerisation at the temperature prevailing at the position where gel formation is required, it is possible to locate the position of gel formation very accurately.

When a thermal initiator is being used it is particularly preferred to use it in combination with a regulator that regulates its initiation effect, for instance to delay the start of polymerisation. The effect of the regulator is influenced by temperature and concentration and so the time of initiation can be controlled for any particular ambient temperature. Suitable initiators are 4,4 azobis-4-cyanovaleric acid (ACVA), persulphates such as ammonium persulphate, and azo-diiso-butyronitrile and 2,2'-azobis-2-amidinopropane hydrochloride. Suitable regulators for thermal polymerisation are known and include potassium and other ferricyanides.

The mixture that is polymerised may include an active ingredient (generally one that is volatile, heat sensitive or otherwise easily deactivated) that is to be trapped within the resultant gel polymer. The ingredient may for instance be a fragrance, insecticide or other pesticide, a pharmaceutical, or a biologically produced material such as an enzyme cell, spore or toxin. It may be introduced by itself or in solution or emulsion or suspension, and may be introduced while in carrier particles into which it has been, for instance, dissolved, suspended or adsorbed or into which it is then trapped as an oil-in-water emulsion by polymerisation of the external phase.

The process can be used for gel immobilisation of biologically active materials.

Particularly preferred processes according to the invention are those in which a permeable material is stabilised by impregnating the material with an aqueous solution of the prepolymer and forming a gel in the permeable material by polymerisation of the prepolymer, for instance as a grouting, sealing or water shut-off process.

The process can be a lagoon sealing process in which event the solution is sprayed or soaked into the porous soil where the sealing is to take place, for instance around a lagoon or ditch and is then polymerised. Preferably however the process is a sewer sealing process for sealing around an underground sewer or a water shut-off process (including profile control processes) to prevent breakthrough or coning from an aquifer to a producing well or to prevent water breakthrough during secondary recovery of oil or to prevent leakage from around well casings or channels behind well casings.

For these purposes the prepolymer preferably has a molecular weight in the range 10,000 to 200,000, most preferably 25,000 to 100,000, and is formed from 10 to 50%, preferably 20 to 40% units (c) in which Z is a linkage of formula (f) where each D is H or COOH (generally H) and m is 0 or 1, n is 1, and each B is H or $CH_3$ (generally H), with the remainder of the polymer being formed from units of water soluble acrylic monomer or monomer blend, preferably acrylamide. The polymer is preferably made by polymerising acrylamide or other water soluble monomer with monoblocked methylene bis acrylamide or other monoblocked monomer (e.g., the quaternary amine derivative) followed by base catalysed elimination or other reaction to remove the blocking group.

For water shut-off purposes, e.g., during enhanced oil recovery, the prepolymer can be provided as an aqueous solution of 0.1 to 50% prepolymer, preferably 3 to 10%. For chemical grouting or sewer sealing the prepolymer is preferably provided as a 5 to 15% solution having a viscosity of below 50, and preferably below 15, cps.

The aqueous composition includes a polymerisation initiator, preferably a thermal initiator, most preferably in combination with a regulator, as described above. As a result of making low viscosity solutions of this polymer by the deblocking route it is possible for the first time to provide a synthetic polymer that is wholly non-toxic and that can be of very accurately controlled composition so as to provide a gel structure of optimum characteristics.

The properties of the gel can be modified by including modifiers such as lithium hydroxide, sodium methoxide or other pH modifiers. Gel fillers, for instance inert particulate materials such as polystyrene latex or sand, may be included.

In another process according to the invention, a particulate or cracked surface (e.g., a dust road or heap or cracked concrete) is stabilised by applying on to the surface an aqueous solution of the acrylic prepolymer and then initiating polymerisation.

In another process a particulate mass, often a wet particulate mass, is mixed with an aqueous solution of the polymerisable prepolymer, which is then polymerised. The polymerisation may be conducted while the mass is shaped in a mould, so as to form moulded articles, but preferably the polymerisation is conducted while stirring the mass so as to produce a friable particulate mixture of bonded particles. The wet mass may, for instance, be coal filter cake or other inorganic or organic particulate material.

The shaped articles made by this technique may be of any desired shape and may be, for instance, bonded boards of wood fibre.

In another process, a substrate is coated with the prepolymer (either as a continuous coating or as a printed or other discontinuous coating), and the prepolymer is then cured by, for example, photo or thermal initiation.

The following are some examples.

EXAMPLE 1

Preparation of N[β-Dimethylamino propionamido methyl] Acrylamide Quaternised with Dimethyl Sulphate A 20% solution of N-[β-dimethylaminopropionamide methyl] acrylamide was prepared as follows:

3.8 moles of methylene bisacrylamide (580 g) was slurried in deionised water (3053 g) in a 5 liter vessel. 4.9 moles of dimethylamine (367 g of 60% solution) was added rapidly to the reaction vessel under mechanical agitation. The vessel was continuously chilled, the temperature was maintained below 40° C. The reaction was left stirring for 3 hours for the addition reaction to go to completion.

B) Quaternisation 4.9 moles of dimethyl sulphate (616 g) was added to the above reaction mixture. The pH dropped from 11.2 to 2.2 over 10 minutes. The vessel was continuously chilled, temperature maintained below 40° C. The resultant 30% aqueous solution of blocked monomer was used in Example 2.

EXAMPLE 2

Copolymerisation of Blocked Monomer with Acrylamide in Ratio 30:70

| Formulation | |
|---|---|
| Acrylamide (50.8%) = | 1,100 g |
| Blocked Monomer (30%) = | 800 g |
| Deionised water = | 2,100 g |
| pH = | 4.0 |

The above monomer solution was prepared and charged into a 5 liter flask, equipped with a stirrer, nitrogen bubbler, and a thermometer. The solution was degassed with nitrogen for 10 minutes. 16 ml of thioglycolic acid and 100 ml of 20% potassium persulphate added to induce polymerisation. A temperature rise from 15° C. to 62° C. was recorded over 6 minutes. The temperature was maintained at 60° C. for a further 1 hour, before cooling back to room temperature.

The viscosity of 20% blocked polymer solution, I, was 11 cP (Brookfield LVT Viscometer).

EXAMPLE 3

Deblocking 1,000 g of the 20% solution of polymer I was charged into a 1 liter pot equipped with a stirrer and a pH electrode. 0.1 g of paramethoxyphenol was added to the polymer solution (polymerisation inhibitor). 10% solution of sodium hydroxide was added to the reaction flask gradually to give a pH of 11.0 and this pH was maintained for 30 minutes by adding further alkali. After this period, the pH was adjusted to about 6.0 with conc. sulphuric acid. A strong odour of trimethylamine is apparent. Air was blown into the elminated mixture to remove any amine odour and to give deblocked polymer solution II.

EXAMPLE 3

Polymerisation of Deblocked Prepolymer

Gel A

The solution of deblocked polymer II was diluted down to 10% concentration with deionised water (viscosity 3.3 cP Brookfield LVT Viscometer). To 100 g of this solution was added 5 ml of 20% triethanolamine and 5 ml of 20% potassium persulphate. After 5 minutes, the mix started to gel. After 10 minutes, a rigid flexible gel was obtained with only a 3° C. exotherm.

Gel B 2.5 g of 40% sodium acrylate was added to 100 g of 10% solution of the deblocked polymer and pH adjusted to 6.0. 5 ml of 20% triethanolamine and 5 ml of 20% ammonium persulphate added to the mix. After 2 minutes, the mix started to gel up. After 7 minutes, a rigid elastic gel was obtained. A 4° C. exotherm was recorded.

EXAMPLE 4

70% by weight acrylamide was copolymerised with 30% blocked MBA as in Example 2 and then deblocked to give a polymer having a weight average molecular weight (by GPC) of 27,200. 10% by weight (based on the prepolymer) sodium acrylate was added to provide an aqueous solution containing 20% polymerisable material. This solution was labelled A.

A similar solution, labelled B, was formed from a similar prepolymer having a molecular weight of 28,600.

Similarly, a blocked copolymer of 90% acrylamide and 10% blocked MBA was formed to a higher molecular weight and deblocked to give a molecular weight of 632,000 and 10%, based on the prepolymer, sodium acrylate was added to provide an aqueous solution containing 10% polymerisable material, and which was labelled C. A similar monomer blend was polymerised to a molecular weight of 713,000 and a 10% solution of it with sodium acrylate was labelled D.

EXAMPLE 5

Solution A was diluted to 1,000 ppm polymer in a synthetic fresh water consisting of 1000 ppm NaCl with 100 ppm $CaCl_2$. The solution viscosity was measured at 23° C., using a Brookfield LVT viscometer with a UL adaptor at 6 rpm (7.3 $s^{-1}$ shear rate), as 3.0 cP.

500 $cm^3$ of solution was passed through a 47 mm diameter, 3.0 micrometer pore size 'Nucleopore' filter, with a nitrogen overpressure of 1.4 $kg/cm^2$, in 32 seconds. In this so called 'Filterability' test (a commonly used industrial test method) high molecular weight acrylamide copolymers typically give flow times in excess of 20 minutes. The solution can be blended with 4,4-azobis-4-cyanovaleric acid (ACVA) as a thermal initiator and injected into a porous downhole structure whereupon it polymerises to a gel.

EXAMPLE 6

Solution B was diluted with synthetic North Sea injection brine at 80° C. and blended with various amounts of ACVA. When gel formation occurred, it occurred within 30 minutes. The product was left at 80° C. overnight and then tested for gel strength. It was found that strong gels were obtained with 0.1 to 0.4% ACVA at 10 to 15% polymer concentrations, weak gels at 5% polymer concentration and no gel at 3% polymer concentration. When the process was repeated using solution C, strong gels were obtained at 0.01 to 0.5% ACVA and 5% polymer and at 0.2 to 0.4% ACVA and 2.5% polymer, but only a weak gel was obtained at 2.5% polymer and 0.1% ACVA.

EXAMPLE 7

Solutions of B were diluted to 5% polymer and blended with 0.2% ACVA and various amounts of potassium ferricyanide. In the absence of ferricyanide gelling was substantially immediate at 80° C. but the gel time was 2.4 hours in the presence of 1,000 ppm ferricyanide, 6 hours in the presence of 1,500 ppm ferricyanide and above 24 hours in the presence of 2,000 ppm ferricyanide.

When the test was repeated with 0.05% ACVA and 500 to 1500 ppm ferricyanide the gel time was above 24 hours, at 0.4% ACVA the gel time was 4.2 hours with 2,000 ppm ferricyanide and 24 hours with 4,000 ppm ferricyanide, and at 0.6% ACVA the gel was 1.3 hours with 2,000 ppm ferricyanide and 9 hours with 4,000 ppm ferricyanide. When the test was repeated with solution D diluted to 5% active polymer, the same general trends were observed.

EXAMPLE 8

Solution B was diluted with synthetic North Sea brine (3.5% solids made up of 2.5% sodium chloride, 0.4% sodium sulphate, 0.02% sodium bicarbonate, 0.2% calcium chloride and 1% magnesium chloride) and the pH adjusted with sodium hydroxide or hydrochloric acid and 0.1 ppm ACVA added. No gel was formed at pH values of 5 and below, a strong gel was formed at pH 6 with a gel time of 4.3 and weaker gels were obtained at pH values of 7.2 to 11.6. The gel time was shortest at pH 8.6 (0.8 hours) but the gel was weakest at this pH. This demonstrates that useful gels can be made over a much wider range of pH values (for instance 5 to 12) than are obtainable by chromium cross linking of polyacrylamide, since such systems generally require that the pH should be between about 3 and 5.5 if useful gel strength is to be obtained.

Similarly, it was found that the gel strength of gels made from solution B in synthetic North Sea brine could be advantageously modified by the addition of lithium hydroxide or a methanolic solution of sodium methoxide. Similarly the gel time and the gel strength could be beneficially modified by including in the solution sand or crushed limestone.

We claim:

1. An aqueous solution of water soluble polymerisable acrylic prepolymer formed from a water soluble monomer or blend of monomers and having 50 to 100 mole % recurring units derived from acrylic monomers (a) and 0 to 50 mole % recurring units derived from other ethylenically unsaturated monomers (b), wherein the prepolymer includes units of formula (c)

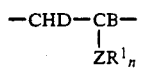

in an amount that is at least 3 units in each prepolymer chain and that is from 0.001 to 100 mole % and in which D is H or COOH, B is H, $CH_3$ or COOH, Z is a linking group having 1 to 6 functionalities, n is 1 to 6, $R^1$ is the group —CB=CHD where B and D are as defined above, and the prepolymer has been made by (i) polymerising monomers (a) and (b) wherein 0.001 to 100% of the said monomers have the formula (d)

where B, D and n are as defined above and $R^2$ is a saturated ethylenic group that can be unblocked to form a group $R^1$ and (ii) unblocking the groups $R^2$ to form units of formula (c).

2. A solution according to claim 1 in which B is H or $CH_3$, D is H, and $R^2$ is bonded by its $\alpha$ carbon atom to a carbonyl group in the linkage Z and has the formula

—CHR.CH$_2$Y where R is H or $CH_3$ and Y is selected from Cl, Br, I, $R^3SO_3$, $R^3CO_2$, $R_3^3N^+$, $R_2^3S^+$, $R_2^3N$, HO, $R^3O$; or $R^2$ has the formula —XCH.CH$_2$Y where Y is as defined above, X is CN or $NO_2$ and $R^3$ is alkyl, aryl, aralkyl, alkaryl or cycloalkyl.

3. A solution according to claim 2, in which $R^2$ is bonded by its $\alpha$ carbon atom to carbonyl and Y is a tert-amino moiety.

4. A solution according to claim 1, in which Z is selected from —CO—, —OCO—, —AOCO—, —COOAOCO— and —CONHANHCO where A is alkylene which is optionally substituted, and optionally interrupted by O or NH.

5. An aqueous solution of water soluble polymerisable acrylic prepolymer formed from a water soluble monomer or blend of monomers and having 50 to 100 mole % recurring units of acrylic monomers (a) and 0 to 50 mole % recurring units of other ethylenically unsaturated monomers (b) and in which there are units of formula (c)

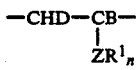

in an amount that is at least 3 units in each prepolymer chain and that is from 0.001 to 100 mole % and in which $R^1$ is the group —CB=CHD, D is H or COOH, B is H, $CH_3$ or COOH, n is 1 to 6 and Z is a linking group having 1 to 6 functionalities selected from —CO—, —OCO—, —AOCO—, —COOAOCO— and —CONHANHCO where A is alkylene which is optionally substituted and is optionally interrupted by O or NH.

6. A solution according to claim 1, in which Z is —CONH—CHD—(CH$_2$)$_m$—NH—CO— where each D is hydrogen or carboxyl, each B is H or $CH_3$ and m is 0, 1 or 2, and n is 1.

7. A solution according to claim 1 having a molecular weight of 10,000 to 200,000 and in which the mole % of units (c) is 10 to 50%.

8. A solution according to claim 1 which is a copolymer of acrylamide with units of formula (c).

9. A solution according to claim 1 having a molecular weight of above 1000 and containing units of formula (c) in a mole percentage that is greater than $$\frac{2.5 \times 10^4}{Mn}$$

where Mn is the number average molecular weight.

10. A process of making an aqueous solution of a water soluble acrylic prepolymer according to claim 1 comprising polymerising in aqueous solution 50 to 100 mole % acrylic monomers (a) with 0 to 50 mole % other ethylenically unsaturated monomers (b) wherein 0.001 to 100 mole % of the monomers are monomers of formula (d)

where B is H, $CH_3$ or COOH, D is H or COOH, Z is a linking group having 1 to 6 functionalities, n is 1 to 6 and $R^2$ is a saturated ethylenic group that can be unblocked to form a group $R^1$ where $R^1$ is —CB=CHD, and then unblocking the groups $R^2$ while in aqueous solution to form a polymer having units of formula (c)

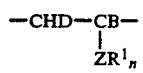

where $R^1$, B, D and n are as defined above.

11. A prepolymer according to claim 6 in which B is H, D is H and m is 0.

* * * * *